United States Patent
Rock et al.

(10) Patent No.: US 8,394,548 B2
(45) Date of Patent: Mar. 12, 2013

(54) SEAL FOR PEM FUEL CELL PLATE

(75) Inventors: Jeffrey A. Rock, Fairport, NY (US);
Gerald W. Fly, Geneseo, NY (US);
Steven G. Goebel, Victor, NY (US); Jeff D. Williams, Tonawanda, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/479,444

(22) Filed: May 24, 2012

(65) Prior Publication Data
US 2012/0231370 A1    Sep. 13, 2012

Related U.S. Application Data

(62) Division of application No. 12/099,393, filed on Apr. 8, 2008, now Pat. No. 8,211,585.

(51) Int. Cl.
*H01M 8/04* (2006.01)
(52) U.S. Cl. .................. 429/463; 429/457; 429/509
(58) Field of Classification Search .................. 429/435, 429/438, 465, 457, 509
See application file for complete search history.

(56) References Cited

U.S. PATENT DOCUMENTS

| | | | |
|---|---|---|---|
| 7,108,936 B2* | 9/2006 | Sasahara et al. | 429/510 |
| 7,393,606 B2* | 7/2008 | Inoue et al. | 429/481 |
| 7,459,227 B2 | 12/2008 | Rock et al. | |
| 7,851,100 B2* | 12/2010 | Kobayashi et al. | 429/463 |
| 7,951,481 B2* | 5/2011 | Ishioka et al. | 429/129 |

FOREIGN PATENT DOCUMENTS

| | | |
|---|---|---|
| CN | 1635643 A | 7/2005 |
| JP | 2007323984 A | 12/2007 |

* cited by examiner

*Primary Examiner* — Hien Vu
(74) *Attorney, Agent, or Firm* — Fraser Clemens Martin & Miller LLC; J. Douglas Miller

(57) ABSTRACT

A seal structure is disclosed for forming a substantially fluid tight seal between a UEA and a plate of a fuel cell system, the seal structure including a sealing member formed in one fuel cell plate, a seal support adapted to span feed area channels in an adjacent fuel cell plate, and a seal adapted to cooperate with a UEA disposed between the fuel cell plates, the sealing member, and the seal support to form a substantially fluid tight seal between the UEA and the one fuel cell plate. The seal structure militates against a leakage of fluids from the fuel cell system, facilitates the maintenance of a velocity of a reactant flow in the fuel cell system, and a cost thereof is minimized.

13 Claims, 5 Drawing Sheets

SEAL FOR PEM FUEL CELL PLATE

CROSS-REFERENCE TO RELATED APPLICATIONS

This application is a division of application Ser. No. 12/099,393, filed on Apr. 8, 2008. The entire disclosure of the above application is incorporated herein by reference.

FIELD OF THE INVENTION

The invention relates to a fuel cell system and more particularly to a seal for sealing between plates of the fuel cell system.

BACKGROUND OF THE INVENTION

Fuel cell systems are increasingly being used as a power source in a wide variety of applications. Fuel cell systems have been proposed for use in power consumers such as vehicles as a replacement for internal combustion engines, for example. Such a system is disclosed in commonly owned U.S. patent application Ser. No. 10/418,536, hereby incorporated herein by reference in its entirety. Fuel cells may also be used as stationary electric power plants in buildings and residences, as portable power in video cameras, computers, and the like. Typically, the fuel cells generate electricity used to charge batteries or to provide power for an electric motor.

Fuel cells are electrochemical devices which combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

The basic process employed by a fuel cell is efficient, substantially pollution-free, quiet, free from moving parts (other than an air compressor, cooling fans, pumps and actuators), and may be constructed to leave only heat and water as by-products. The term "fuel cell" is typically used to refer to either a single cell or a plurality of cells depending upon the context in which it is used. The plurality of cells is typically bundled together and arranged to form a stack with the plurality of cells commonly arranged in electrical series. Since single fuel cells can be assembled into stacks of varying sizes, systems can be designed to produce a desired energy output level providing flexibility of design for different applications.

A common type of fuel cell is known as a proton exchange membrane (PEM) fuel cell. The PEM fuel cell includes three basic components: a cathode, an anode and an electrolyte membrane. The cathode and anode typically include a finely divided catalyst, such as platinum, supported on carbon particles and mixed with an ionomer. The electrolyte membrane is sandwiched between the cathode and the anode to form a membrane-electrode-assembly (MEA). The MEA is disposed between porous diffusion media (DM). The DM facilitates a delivery of gaseous reactants, typically the hydrogen and the oxygen from air, to an active region defined by the MEA for an electrochemical fuel cell reaction. Nonconductive gaskets and seals electrically insulate the various components of the fuel cell.

When the MEA and the DM are laminated together as a unit, for example, with other components such as gaskets and the like, the assembly is typically referred to as a unitized electrode assembly (UEA). The UEA is disposed between fuel cell plates, which act as current collectors for the fuel cell. The UEA components disposed between the fuel cell plates are typically called "softgoods". The typical fuel cell plate has a feed region that uniformly distributes the gaseous reactants to and between the fuel cells of the fuel cell stack. The feed region may have a broad span that facilitates a joining of the fuel cell plates, e.g., by welding, and a shifting of flows between different elevations within the jointed plates. The feed region includes supply ports that distribute the gaseous reactants from a supply manifold to the active region of the fuel cell via a flow field formed in the fuel cell plate. The feed region also includes exhaust ports that direct the residual gaseous reactants and products from the flow field to an exhaust manifold.

The stack, which can contain more than one hundred plates, is compressed, and the elements held together by bolts through corners of the stack and anchored to frames at the ends of the stack. In order to militate against undesirable leakage of fluids from between the plate assemblies, a seal is often used. The seal is disposed along a peripheral edge of the plate assemblies and selected areas of the flow paths formed in the plates. Prior art seals have included the use of metal seals, elastomeric seals, and a combination thereof. The prior art seals have performed adequately for prototyping. However, a cost of the prior art seals and a sensitivity of the prior art seals to dimensional and environmental variation makes a use thereof undesirable for full scale production The prior art seals typically require the fluids to follow a tortuous flow path through the fuel cell. The tortuous flow path typically includes open areas which reduce a velocity of the flow of the fluids. The reduced velocity of the fluids can adversely affect the performance of the fuel cell stack. Additionally, the reduced velocity of the fluids has been known to contribute to an accumulation of water in the flow paths, which can block the flow of the fluids within at least a portion of the fuel cell stack and reduce the electrical output thereof.

It would be desirable to produce a seal assembly for sealing between plates of a fuel cell system, wherein the seal assembly militates against a leakage of fluids from the fuel cell system, facilitates a maintenance of a desired velocity of the fluid flow in the fuel cell system, and a cost thereof is minimized.

SUMMARY OF THE INVENTION

Compatible and attuned with the present invention, a seal assembly for sealing between plates of a fuel cell system, wherein the seal assembly structure militates against a leakage of fluids from the fuel cell system, facilitates a maintenance of a desired velocity of the reactant flow in the fuel cell system, and a cost thereof is minimized, has surprisingly been discovered.

In one embodiment, a plate for a fuel cell comprises a plate with a first surface, a second surface, and a plurality of header openings formed therein; a flow field formed on the first surface of the plate, the flow field including an inlet feed region and an outlet region, the inlet region and the outlet region having feed area channels to provide fluid communication with at least one header opening; and at least one elongated sealing member formed on the plate adapted to cooperate with a seal assembly to form a substantially fluid tight seal therebetween.

In another embodiment, a seal assembly for a fuel cell comprises a fuel cell plate with a first surface, a second surface, and a plurality of header openings formed therein; a flow field formed on the first surface of the plate, the flow field including an inlet feed region and an outlet region, the inlet region and the outlet region having feed area channels to provide fluid communication with at least one header opening; at least one elongate sealing member formed on the plate including a first lateral side and a spaced apart second lateral side with at least one sealing surface disposed therebetween; and at least one sealing component adapted to cooperate with the sealing member to form a substantially fluid tight seal therebetween.

In another embodiment, a fuel cell stack comprises at least one end plate having a flow field formed on a surface thereof and a plurality of header openings formed therein in selected fluid communication with the flow field, the flow field including an inlet feed region, an outlet region, a plurality of feed area channels in selected fluid communication with the inlet region and the outlet region, and at least one sealing member formed around at least one of the header openings formed in the end plate; at least one bipolar plate disposed adjacent the end plate, wherein each bipolar plate includes, a flow field formed on at least one of a first surface and a second surface and a plurality of header openings formed therein in selected fluid communication with the flow field, the flow field including, an inlet feed region, an outlet region, a plurality of feed area channels in selected fluid communication with the inlet region and the outlet region, and at least one sealing member formed around at least one of the header openings formed in the bipolar plate; a unitized electrode assembly disposed between each plate; and a seal having a first surface and a second surface, the first surface adapted to form a substantially fluid tight seal with the sealing member of at least one of the end plate and the bipolar plate; and a seal support having a first surface and a second surface, the first surface adapted to form a substantially fluid tight seal with one of the second surface of the seal and the unitized electrode assembly.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
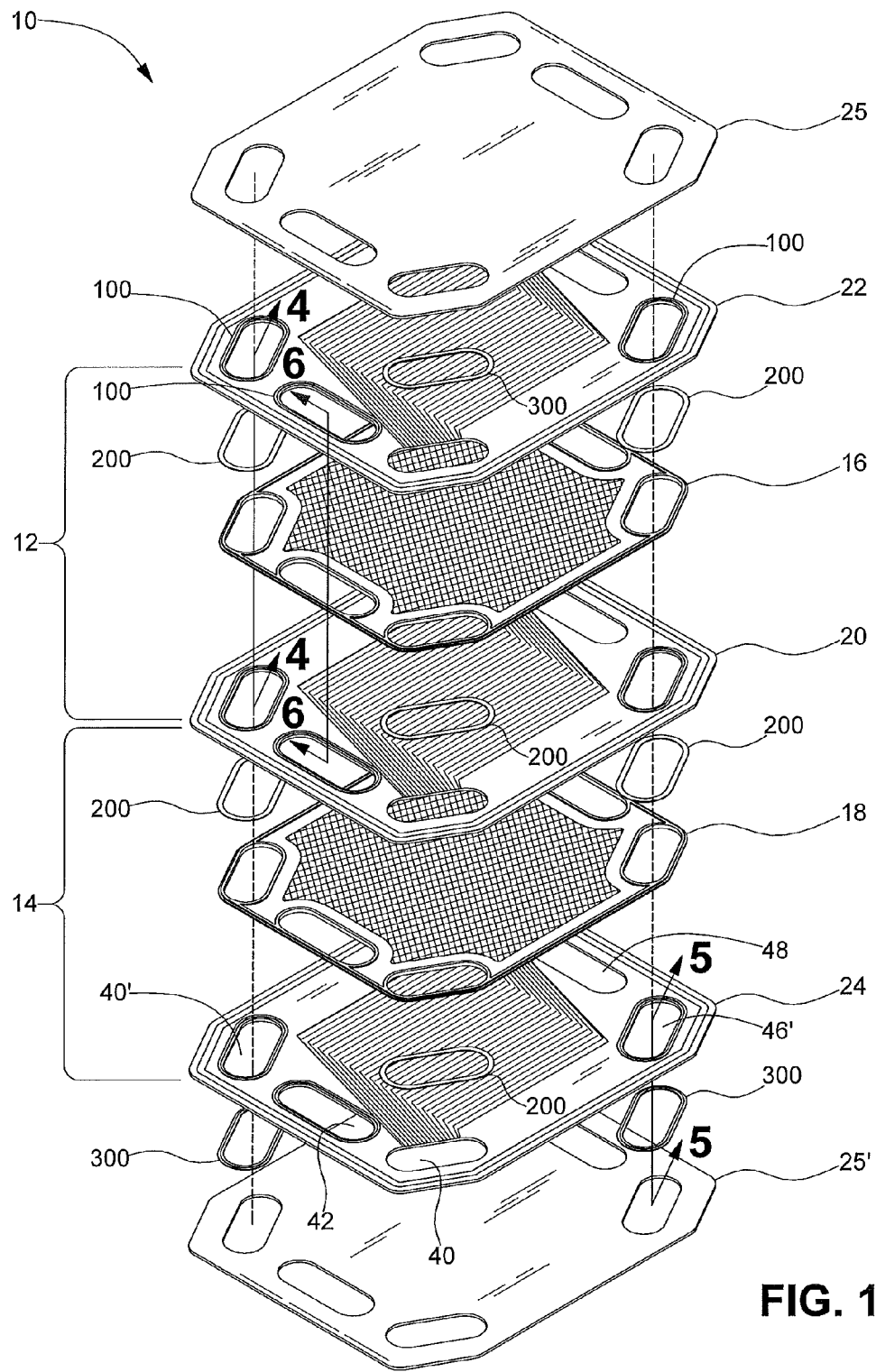
FIG. 1 is an exploded perspective view of a proton exchange membrane fuel cell stack according to an embodiment of the invention.

FIG. 1 is schematic illustration of a proton exchange membrane (PEM) fuel cell stack 10 having two electricity producing cells 12 and 14. Although a bipolar PEM fuel cell stack is shown, it is understood that other fuel cell types and configurations can be used without departing from the scope and spirit of the invention. It is also understood that fuel cell stacks having more cells and plates can be and typically are used.

The fuel cell stack 10 includes a first a unitized electrode assembly (UEA) 16 and a second a UEA 18. The UEA's 16, 18 include a membrane-electrode-assembly (MEA) (not shown) disposed between porous diffusion media (DM) (not shown). It should be understood that the MEA and the DM can be separate components rather than being combined to form the UEA. The UEA's 16, 18 are disposed between fuel cell plates, which act as current collectors for the fuel cell. An electrically conductive, liquid-cooled, bipolar plate assembly 20 is disposed between the first UEA 16 and the second UEA 18. The first UEA 16, the second UEA 18, and the bipolar plate assembly 20 are stacked together between monopolar end plate assemblies 22, 24. In the illustrated embodiment, the monopolar end plate assemblies 22, 24 are bipolar plate assemblies adapted to function as monopolar end plate assemblies. Electrically conductive adapter plates 25, 25' are provided to cooperate with a bipolar plate that is identical to bipolar plate 20 to form each of the monopolar end plate assemblies 22, 24. It should be understood that end plates specifically adapted to function as end plates may also be employed.

Figure 2:
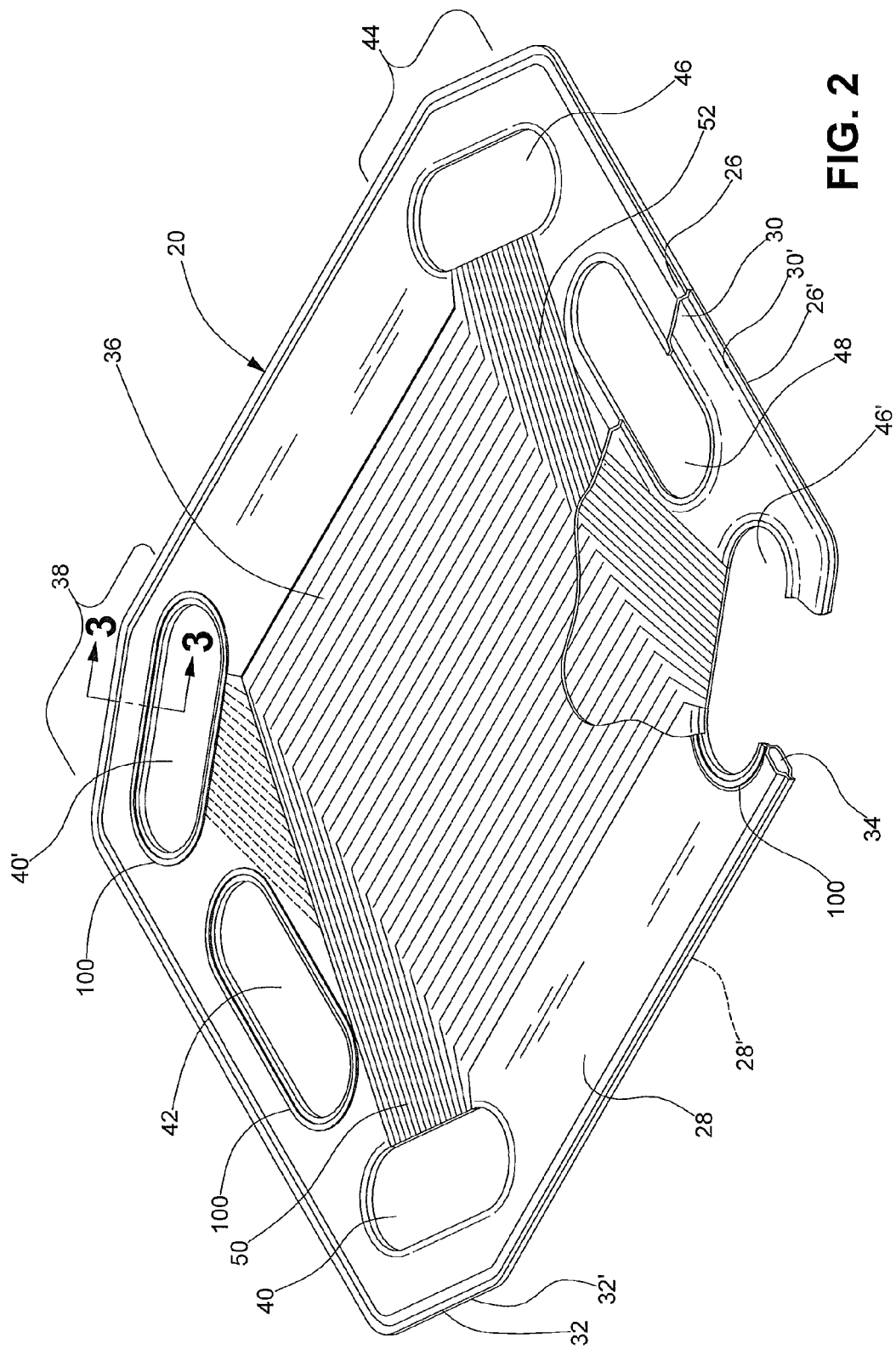
FIG. 2 is a fragmentary perspective view of a fuel cell plate of the fuel cell stack shown in FIG. 1.

The bipolar plate assembly 20 is formed from a pair of plates 26, 26', more clearly illustrated in FIG. 2. Each plate has a first surface 28, 28', a second surface 30, 30' and an outer peripheral edge 32, 32'. The second surfaces 30, 30' of the plates 26, 26' are bonded together in vertical alignment to form a coolant chamber 34 therebetween. The plates 26, 26' can be bonded by various means such as welding or an application of an adhesive, for example. The plates 26, 26' are typically formed from a planar metal sheet by a stamping operation, although other methods can be used as desired.

Each plate 26, 26' includes a flow field 36 formed on the first surface 28, 28' respectively. FIG. 2 shows the flow field 36 formed in the plate 26. It should be understood that the plate 26' includes a flow field on the first surface 28' having the same structural aspects as the flow field 36 formed on the first surface 28 of the plate 26. However, for clarity, FIG. 2 does not include references to the flow field formed in plate 26'. The flow field 36 distributes a fuel and an oxidant gas to the cells 12, 14 over the respective faces of the UEA's 16, 18. The plate 26, 26' includes header openings 40, 40' formed therein to provide an inlet for the hydrogen and the oxygen to the cells 12, 14. Feed area channels 50 are formed in the inlet region 38 to provide fluid communication between the header opening 40 and the flow field 36. Additionally, header opening 42 is formed in the plate 26, 26' to provide an inlet for the coolant to the chamber 34. The plate 26, 26' includes header openings 46, 46' formed therein to provide an outlet for the hydrogen and the oxygen from the cells 12, 14. Feed area channels 52 are formed in the outlet region 44 to provide fluid communication between the header opening 46 and the flow field 36. Additionally, header opening 48 is formed in the plate 26, 26' to provide an outlet for the coolant from the chamber 34.

Flow channels (not shown) may be formed in plates 26, 26' to provide fluid communication with the coolant chamber 34 and the respective header openings 42, 48. Alternatively, apertures (not shown) may be formed in the plates 26, 26' adjacent header openings 42, 48 to provide fluid communication with the coolant chamber 34 and the respective header opening 42, 48. It should be understood that both the flow channels and the apertures may be formed in the plates 26, 26' to provide fluid communication with the coolant chamber 34 and the respective header opening 42, 48.

Sealing members 100, more clearly illustrated in FIGS. 3a to 3d and described herein below, are formed as an elongate protuberance in the plates 26, 26' adjacent to and circumscribing the header openings 40', 46' to form a substantially fluid tight seal therearound. The sealing member 100 is also formed around the aperture 42 to form a substantially fluid tight seal therearound and militate against a coolant from flowing between adjacent fuel cell plates 20, 22, 24. It should be understood that the sealing members can be formed adjacent to and circumscribing the header openings 40, 46, 48 rather than header openings 40', 46', 42, or elsewhere on the plates 26, 26' as desired.

As illustrated in FIG. 1, the end plates 22, 24 and the bipolar plate 20 are in substantial vertical alignment, placing the respective header openings 40, 40', 42, 46, 46', 48 therein in alignment to form a fuel supply header and a fuel exhaust header, an oxidant supply header and an oxidant exhaust header, and a coolant supply header and a coolant exhaust header. In the embodiment described herein, the fuel is hydrogen, the oxidant is oxygen, and the coolant is water, although it should be understood that other fuels, oxidants, and coolants can be used as desired.

The fuel cell stack 10 typically includes clamping plates (not shown) at each end of the fuel cell stack 10. The clamping plates are adapted to provide a compressive force on the fuel cell stack 10. The clamping plates include a plurality of inlets and outlets, the inlets and outlets providing fluid communication between the fuel cell 10 and a source of reactants and coolant, and an exhaust of the reactants and coolants, respectively.

A seal assembly 200, more clearly illustrated in FIGS. 4a and 4b and described herein below, is provided between adjacent header openings 40, 40', 46, 46' in each of the respective plates 22, 20 and 20, 24. The seal assembly 200 is adapted to cooperate with the sealing member 100 and the adjacent UEA 16, 18 to form a substantially fluid tight seal between the sealing member 100 and the adjacent UEA 16, 18. In the embodiment shown in FIG. 1, the seal assembly 200 forms a continuous ring circumscribing an area to be sealed. It should be understood that the seal assembly 200 can be adapted to seal a single edge or any portion of an edge.

Figure 5:
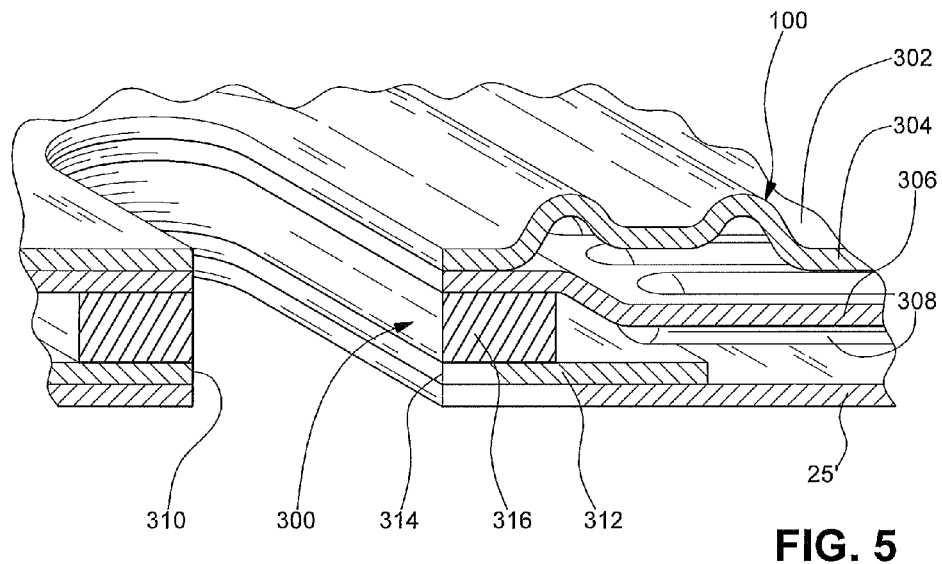
FIG. 5 is a fragmentary perspective view of the seal assembly at a reactant header in a terminal side of an end plate taken along line 5-5 in FIG. 1.

A modified seal assembly 300, more clearly illustrated in FIG. 5 and described herein below, is provided between selected apertures formed in the electrically conductive plates 25, 25' and the header openings 40, 40', 46, 46' in the respective end plates 22, 24. The modified seal assembly 300 is adapted to cooperate with the electrically conductive plates 25, 25' and the adjacent end plates 22, 24 to block the flow of reactants across the flow field 36 adjacent the conductive plate. By blocking the reactant flow across the flow field 36 in one of the plates 26, 26' forming the end plates 22, 24, the end plates 22, 24 can function as monopolar plates.

Figure 3A:
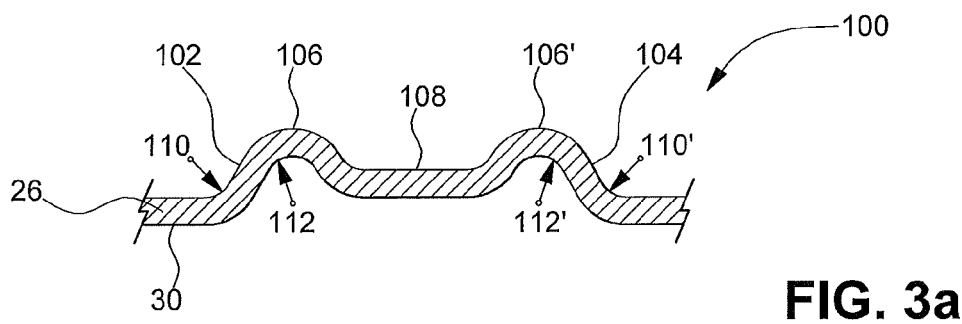
FIG. 3a is a fragmentary cross sectional view of a sealing member formed in the fuel cell plates shown in FIG. 1 and FIG. 2 taken along line 3-3 in FIG. 2.

FIG. 3a illustrates a cross section of the sealing member 100 formed in the plate 26 according to one embodiment of the invention. The sealing member 100 has a first lateral side 102 and a spaced apart second lateral side 104, each having an upper end 106, 106', respectively. A substantially planar sealing surface 108 is disposed between the respective upper ends 106, 106'. The planar sealing surface 108 is recessed in respect of the upper ends 106, 106'. Recessing the planar sealing surface 108 shields the planar sealing surface 108 from damage such as scratches or dents, for example, which could prevent a substantially fluid tight seal from being formed on the planar sealing surface 108.

The lateral sides 102, 104 include at least a first radius 110, 110' and a second radius 112, 112' respectively. The radii 100, 110', 112, 112' are adapted to provide a resilient response in the sealing member 100 to a normal load applied to the sealing surface 108. The resiliency of the sealing member 100 facilitates the forming and maintaining of the seal on the sealing surface 108. A dimension of the radii 100, 110', 112, 112' can be selected to achieve the desired resiliency in the sealing member 100. Favorable results have been found using radii 100, 110', 112, 112' between about 0.1 millimeters to 0.5 millimeters, although other radii can be used.

Figure 3B:
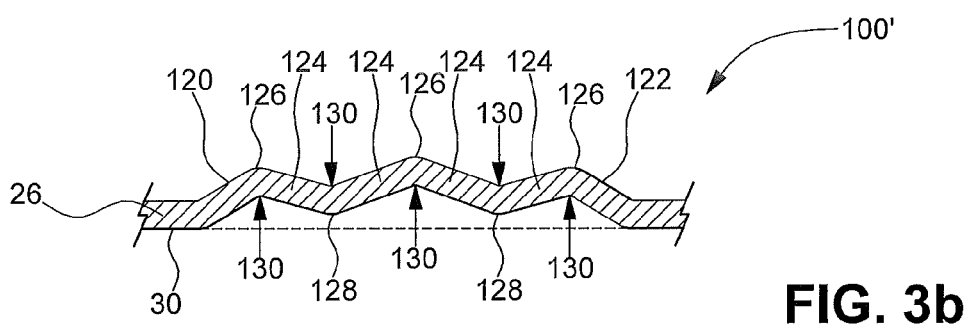
FIG. 3b is a fragmentary cross sectional view of a sealing member according to another embodiment of the invention.
Figure 3C:
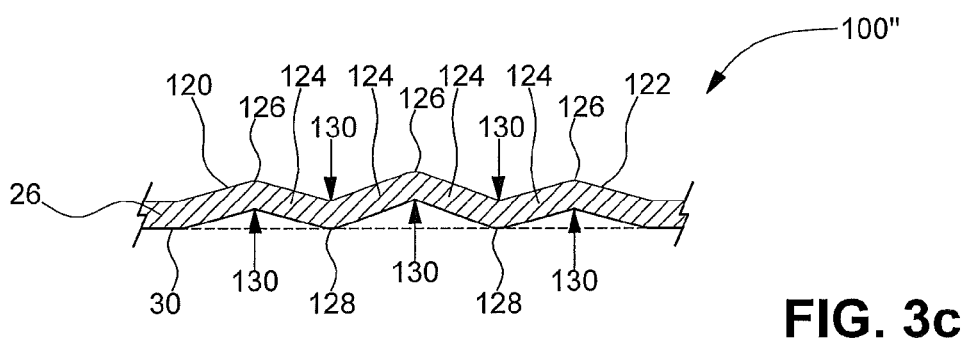
FIG. 3c is a fragmentary cross sectional view of a sealing member according to another embodiment of the invention.

FIGS. 3b and 3c illustrate a cross section of the sealing member 100', 100" according to another embodiment of the invention. In FIGS. 3b and 3c, each of the sealing members 100' and 100" has a first lateral side 120 and a spaced apart second lateral side 122. A series of four interconnected substantially planar segments 124 are formed between the lateral sides 120, 122. The lateral sides 120, 122 and segments 124 are connected at angles to form three apexes 126 and two troughs 128, each apex 126 providing a sealing surface. It should be understood that fewer or additional segments 124 can be provided to form fewer or additional apexes 126 and troughs 128 as desired. A radius 130 is typically formed at each apex 126 and trough 128. Favorable results have been found using radii 130 between about 0.1 millimeters to 0.5 millimeters, although other radii can be used.

In FIG. 3b the sealing member 100' is formed to locate the troughs 128 in an elevated position in respect of the second surface 30 of the plate 26. The elevated position of the troughs 128 provide a resilient response in the sealing member 100' to a normal load applied to the apexes 126. Alternatively, as shown in FIG. 3c, the troughs 128 can be located substantially coplanar in respect of the second surface 30 of the plate 26. The coplanar position of the troughs 128 increases the rigidity of the seal member 100" illustrated in FIG. 3c as compared to the seal member 100' illustrated in FIG. 3b.

Figure 3D:
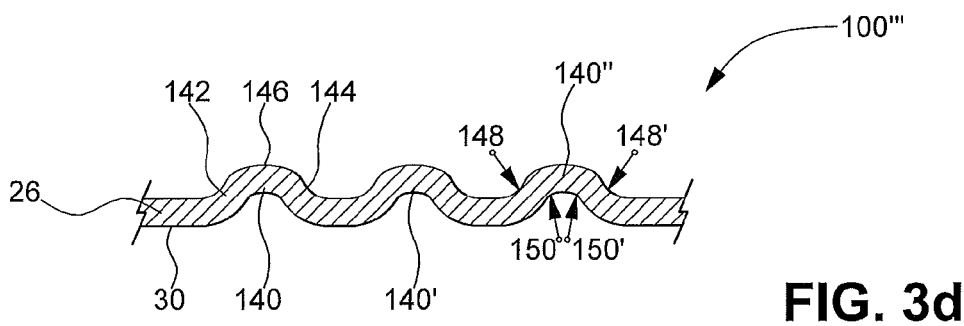
FIG. 3d is a fragmentary cross sectional view of a sealing member according to another embodiment of the invention.

FIG. 3d illustrates a cross section of the sealing member 100''' according to yet another embodiment of the invention. In FIG. 3d, the sealing member 100''' includes three coextensive elongate protuberances 140, 140', 140". Each protuberance 140, 140', 140" has a first lateral side 142 and a spaced apart second lateral side 144 with a sealing surface 146 disposed therebetween. It should be understood that fewer or additional protuberances can be provided as desired. The lateral sides 142, 144 include at least a first radius 148, 148' and a second radius 150, 150' respectively. Favorable results have been found using the radii 148, 148', 150, 150' between about 0.1 millimeters to 0.5 millimeters, although other radii can be used.

A stretch bending process may be employed to form the sealing member 100, 100', 100", 100''' illustrated in FIGS. 3a to 3d. The stretch bending process facilitates the removal of surface imperfections in the sealing surfaces 108, 126, 146, and facilitates the modification of a height of the sealing member 100, 100', 100", 100''' with minimized stamping tooling changes. It should be understood other processes may be employed to form the sealing member 100, 100', 100", 100'''.

Figure 4A:
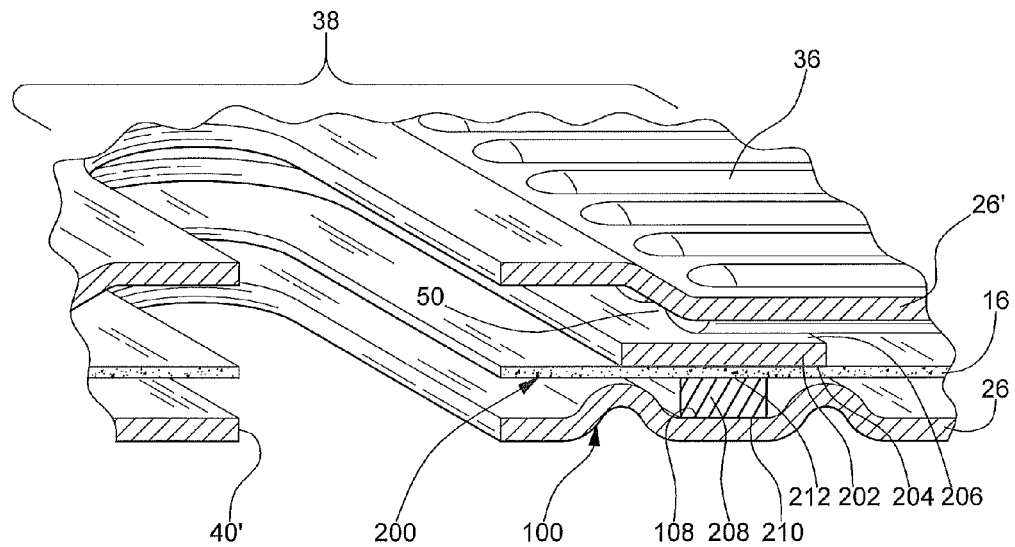
FIG. 4a is a fragmentary perspective view of a seal assembly between two adjacent fuel cell plates at a reactant header taken along line 4-4 in FIG. 1.

FIG. 4a illustrates the seal assembly 200 according to an embodiment of the present invention. The seal assembly 200 includes a substantially rigid seal support 202 having a first side 204 and a second side 206. The second side 206 of the seal support 202 is in contact with and adapted to span the feed area channels 50 in the inlet region 38 of the flow field 36 in the fuel cell plate 26'. It should be understood that the seal support 202 can be attached to the plate 26' by welding, for example or bonded to the UEA with an adhesive. The first side 204 of the seal support 202 is in contact with one side of the UEA 16.

The seal assembly 200 also includes a seal 208 having a first sealing surface 210 and a second sealing surface 212. The seal 208 is disposed on an opposite surface of the UEA 16 from the seal support 202. The second surface 212 of the seal 208 is in contact with the UEA 16 to form a substantially fluid tight seal therebetween. The first sealing surface 210 is in contact with the sealing surface 108 of the sealing member 100 formed in the adjacent plate 26, and adapted to form a substantially fluid tight seal tight seal between the seal 208 and the sealing surface 108.

A printing means may be employed to dispose an elastomeric material on the UEA 16 to form the seal 208. Additionally, the elastomeric material may be dispensed from a nozzle onto the UEA 16 employing a cure in place process. Other methods of application of the seal 208 can be used as desired. It should be understood that the seal 208 may be disposed on the sealing member 100. Additionally, it should be understood that the seal 208 can be disposed on a substrate forming a separate component, or can be a separate component that is placed in a position between the sealing member 100 and the UEA 16.

In the embodiment shown in FIG. 4*a*, seal 208 is a single seal, however, it should be understood that the seal 208 can include two or more spaced apart coextensive seals.

In the embodiment illustrated in FIG. 4*a*, the seal assembly is shown together with the sealing member 100 as illustrated in FIG. 3*a*. It should be understood that the sealing member 100', 100", 100''' as illustrated in FIGS. 3*b* to 3*d*, respectively, can be employed with the seal assembly 200 shown in FIG. 4*a*.

Figure 4B:
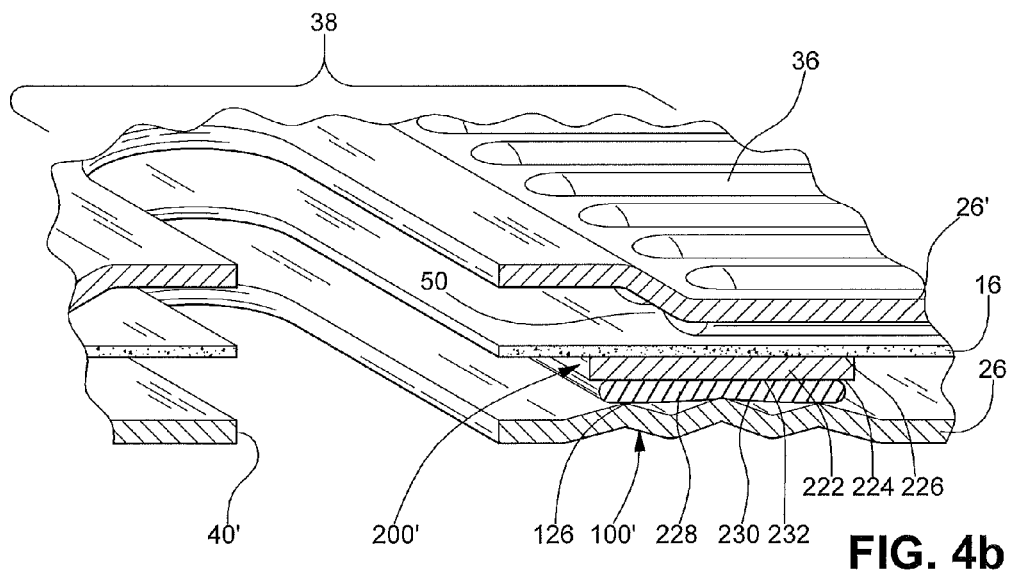
FIG. 4b is a fragmentary perspective view of a seal assembly according to another embodiment of the invention.

FIG. 4*b* illustrates the seal assembly 200 according to another embodiment of the present invention. In FIG. 4*b* the seal assembly 200' includes the UEA 16 having one side thereof in contact with and spanning the feed area channels 50 in the inlet region 38, of the flow field 36 in the fuel cell plate 26'. A substantially rigid seal support 222 having a first side 224 and a second side 226 is disposed adjacent the UEA 16 positioning the second side 226 of the seal support 222 in contact with an opposite side of the UEA 16 from the plate 26'. It should be understood that an adhesive can be provided between the second side 226 of the support 222 and the UEA 16 to facilitate the formation of a substantially fluid tight seal therebetween. The seal support 222 supports the UEA 16 in the areas where the UEA 16 spans the respective feed area channels 50. A seal 228 having a first sealing surface 230 and a second sealing surface 232 is disposed on the first side 224 of the seal support 222 to position the second sealing surface 232 of the seal 228 in contact with the first side 224 of the seal support 222 to form a substantially fluid tight seal therebetween. The first sealing surface 230 of the seal 228 is in contact with the apexes 126 of the adjacent sealing member 100'. The first sealing surface 230 is adapted to form a substantially fluid tight seal between the seal 228 and the apexes 126 formed in the adjacent plate 26.

The elastomeric material may be dispensed from a nozzle onto the seal support 222 employing a cure in place process. Other methods of application of the seal 228 can be used as desired. It should be understood that the seal 228 may be disposed on the sealing member 100' rather than or in addition to the seal support 222.

In the embodiment shown in FIG. 4*b*, seal 228 provides a single seal member, however, it should be understood that the seal 228 can include two or more spaced apart coextensive seals. Additionally, the seal assembly 200' is shown as it would appear with the seal members 100' as illustrated in FIG. 3*b*. It should be understood that the seal members 100', 100", 100''' as illustrated in FIGS. 3*a*, 3*c*, and 3*d*, respectively, can be employed with the seal assembly 200' shown in FIG. 4*b*.

The seal assemblies 200, 200' illustrated in FIGS. 4*a* and 4*b* compensate for a misalignment between the components of the fuel cell stack 10 which would otherwise result in a reduction in the effectiveness of the seal assembly 200, 200'. A width of the seal support 202, 222 is greater than a width of the sealing surface in the sealing member 100, 100'. The sealing member 100, 100' can have some degree of a lateral misalignment in respect of an adjacent fuel cell plate due to a manufacturing variation, for example. Because the seal support 202, 222 is wider than the sealing surface in the sealing member 100, 100', the sealing member 100, 100' does not require exact alignment with the adjacent seal assembly 200, 200' to form a seal therewith. The seal assembly 200, 200' can form a seal within a predetermined range of misalignment. It is understood the range of misalignment can be adjusted as desired by changing a width of the seal support 202, 222.

In FIGS. 4*a* and 4*b*, the seal supports 202, 222 are shown as substantially planar in the assembled fuel cell stack 10. It should be understood that the seal supports 202, 222 can be formed to a shape that imparts a resiliency thereto. For example, the seal support can be formed to have a curved shape in a relaxed condition by having an inner and an outer edge thereof curve concavely toward the adjacent feed area channels 50. The curved seal support may be deflected to a substantially planar position, as illustrated in FIGS. 4*a* and 4*b* when the fuel cell stack 10 is assembled and a compressive load applied. By curving the seal supports 202, 222, a resiliency or a spring like response is provided thereto. The resiliency of the curved seal support facilitates the forming and maintaining of the substantially fluid tight seal. Further, the seal supports 202, 222 may include at least one non-planar element such as an inflection or a ridge, for example, to facilitate the forming and maintaining of the substantially fluid tight seal between the seal supports 202, 222 and the UEA 16 or seal 228, respectively. Favorable results have been obtained using a spring steel for the seal supports 202, 222, although other materials can be used as desired.

It has been found that the material removed from the plates 26, 26' to form the header openings 40, 40', 46, 46' therein may be employed to form the seal supports 202, 222 for the seal assembly 200. Savings in tooling costs, material costs, and process time have also been achieved by forming the seal supports 202, 222 from the material removed from the plates 26, 26' to form the header openings 40, 40', 46, 46' therein. However, other materials can be used.

It should be understood that a thickness or a rigidity can be provided to the UEA 16 or other substrate to eliminate the need for the seal supports 202, 222 in the seal assembly 200. With such a UEA or substrate, the thickness or rigidity of the substrate or UEA substantially uniformly transfers the contact force provided by the clamping plates through the fuel cell stack 10 to form the substantially fluid tight seal between the seal assemblies 200 and the adjacent sealing members 100.

The seal assembly 200 enables a fluid or a media to flow through the feed area channels 50, 52 past the seal assembly 200. The fluid, either the fuel or the oxidant in the embodiment shown, enters the flow field 36 and exits the flow field 36 by flowing through the respective feed area channels 50, 52 that are spanned by the seal support 202 or 222. The feed area channels 50, 52 form a straight through tunnel-plate flow path which militates against a reduction in the velocity of the fluid as it passes therethrough. Additionally, by utilizing the straight through tunnel-plate flow path, the fluid is not caused to pass through any portion of the chamber 34 within the bipolar plate 20 or the end plates 22, 24, which is typically required when employing a prior art seal. The elimination of passing the fluid through the chamber 34 maximizes a capacity of the chamber 34 to receive the coolant. It should be understood that a width of the feed area channels 50, 52 may be reduced or increased in the area of the seal assembly 200 in respect of the width of the channels in other areas of the flow field 36. The width of the feed area channels 50, 52 can be selected to optimize the width of the spanned feed area channels 50, 52 in respect of the rigidity of the seal supports 202, 222 and to effect the velocity of the reactant flow therethrough.

The compressive force provided by the clamping plates causes a compression of the fuel cell stack 10, and, consequently, the sealing members 100 and the seal assemblies 200 therein. The compression results in a contact force between the seals 208, 228 and components adjacent thereto. Additionally, the contact force secures the UEA's 16, 18 within the fuel cell stack 10.

An overall height or stack height of the fuel cell 10 will typically change during the operation thereof. Such changes can result from thermal expansions and contractions of the components therein, as well as a swelling of the UEA's 16, 18 due to a humidification thereof. When the fuel cell is operating at low temperatures, for example, the prior art fuel cell seals often cannot maintain a substantially fluid tight seal between adjacent plates and are prone to leaking. Further, at a maximized stack height, when the fuel cell is operating at an elevated temperature and with UEA swell, for example, the prior art seals with limited elastic response cause the contact force between the UEA's 16, 18 and the adjacent plates 20, 22, 24 to decrease, which can cause fluid leaks between adjacent plates. The increased resiliency provided by the sealing member 100 and the sealing member seal assembly 200 militates against leaks between adjacent fuel cell plates 20, 22, 24 during typical operating conditions or operation at elevated temperatures, low temperatures, and UEA swell.

The resilient nature of the combined sealing member 100 and the seal assembly 200 of the present invention also optimizes the disassembly and rebuilding process of the fuel cell stack 10. For example, the fuel cell plates 20, 22, 24 utilizing the sealing member 100 can be reused since deformation of the sealing member 100 is minimized. The fuel cell stack 10 can be disassembled; components of the fuel cell stack 10, such as the UEA 16, 18 and the sealing assembly 200 can be replaced; and the fuel cell 10 can then be reassembled with the original fuel cell plates 20, 22, 24. The resilient nature of the combined sealing member 100 and the seal assembly 200 allows the seal between adjacent plates to be reestablished while substantially maintaining the original height of the fuel cell stack 10.

As previously indicated, a bipolar plate, such as bipolar plate 20, can be modified to form the monopolar end plates 22, 24 for the fuel cell stack 10. The formation of the end plates 22, 24 from a bipolar plate eliminates the need to produce a separate end plate which would require additional tooling and manufacturing costs to produce. The modified seal assembly 300 illustrated in FIG. 5 is adapted to cooperate with a bipolar plate 302 and the conductive plate 25' to form an end plate such as the end plates 22, 24 shown in FIG. 1. The plate 302 has a first side 304 and a second or terminal side 306. The first side 304 forms an anode plate or a cathode plate for a respective end of the fuel cell stack 10. The terminal side 306 of the end plate 302 does not receive a flow of fuel or oxidant and therefore feed area channels 308 must be blocked off from header opening 310 to prevent the flow of reactants across the terminal side 306 of the end plate 302.

The modified seal assembly 300 includes a seal support 312 adapted to span the feed area channels 308 formed in the terminal side 306 of the plate 302. The seal support 312 circumscribes the header opening 310 and includes one edge 314 extending laterally past the feed area channels 308 toward the header opening 310. A spacer 316 is disposed between the terminal side 306 of the plate 302 and the seal support 312 adjacent the one edge 314. The spacer 316 circumscribes the aperture 310 and forms substantially fluid tight seals between itself and both the terminal side 306 of the plate 302 and the seal support 312 to block the flow of reactants through the feed area channels 308.

In the embodiment shown, the conductive plate 25', the seal support 312, the spacer 316, and the terminal side 306 of the plate 302 are joined together by welding. Other means of joining together the components such as an adhesive can be employed as desired. Alternatively, a seal (not shown) such as an elastomeric seal can be provided between the respective surfaces of the spacer 316 and the terminal side 306 of the plate 302 and the seal support 312. The clamping force provided by the clamping plates compresses the components to form substantially fluid tight seals therebetween. Additionally, the seal support 312 and the spacer 316 can be integrally formed as a single component or integrally formed with either the second side 306 of the plate 302 or the conductive plate 25.

Alternatively, for the end plate 24 at the terminal end or dry end of the fuel cell stack 10, the flow of reactants to the terminal side 306 of the plate 302 can be blocked by bonding a covering (not shown) over the aperture 310 causing the reactants to be blocked from the terminal side 306 of the plate 302. Alternatively, the terminal side 306 may be formed by refraining from forming the header opening 310 therein. Additionally, the conductive plate 25' can be formed without having apertures formed therein.

The electrically conductive adapter plates 25, 25' transmit the compressive force from the clamping plates to the end plate assemblies 22, 24, sealing members 100 and the seal assemblies 200, 300. Additionally, the conductive adapter plates 25, 25' provide electrical conductivity between the end plate assemblies 22, 24 and the adjacent clamping plate.

Figure 6:
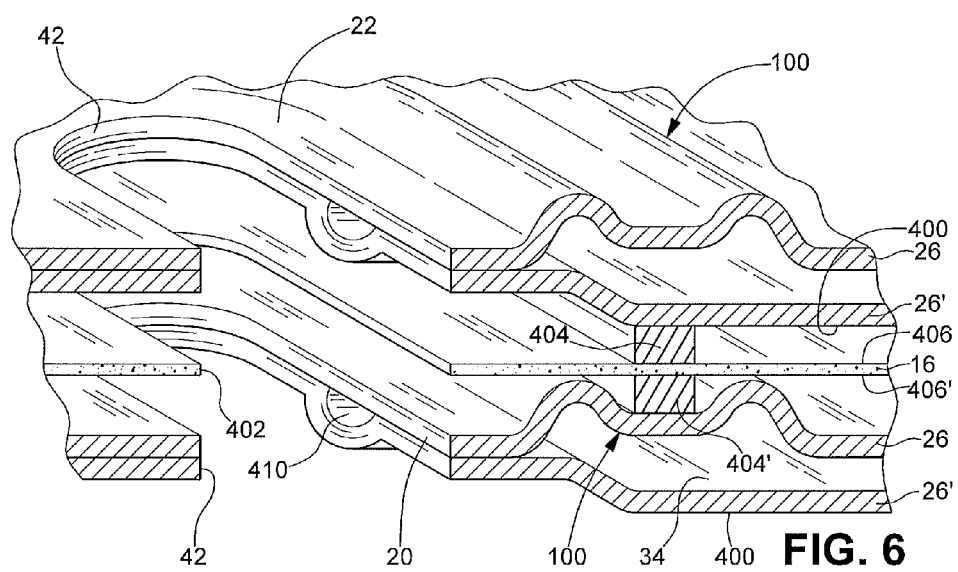
FIG. 6 is a fragmentary perspective view of a seal formed between two adjacent fuel cell plates at a coolant header taken along line 6-6 in FIG. 1.

A substantially fluid tight seal may also be formed at selected locations between the UEA 16, 18 and adjacent plates 20, 22, 24. A substantially fluid tight seal formed between the plates 20, 22 at the aperture 42 is illustrated in FIG. 6. The sealing member 100 is formed in plate 26 of the bipolar plates 20, 22 to circumscribe the aperture 42 while the surface 400 circumscribing the aperture 42 in the adjacent plate 26' of the bipolar plates 20, 22 is substantially planar. An aperture 402 formed in the UEA 16 is adapted to be in substantial alignment with header opening 42 in the bipolar plates 20, 22 to form the coolant header. An elastomeric seal 404, 404' is disposed on an upper surface 406 and a lower surface 406', respectively, of the UEA 16 adjacent to and circumscribing the aperture 402. The seal 404 is in contact with the planar surface 400 adjacent aperture 42 in bipolar plate 22 while the seal 404' is in contact with the sealing member 100 circumscribing the aperture 42 in bipolar plate 20. The clamping force provided by the end clamps (not shown) form a substantially fluid tight seal between the seals 402, 402' and the planar surface 400 and sealing member 100, respectively, to prevent coolant from flowing between the plates 20, 22. Flow channels 410 can be formed between the facing plates 26, 26' of each of the plate assemblies 20, 22, 24 to provide fluid communication between the coolant header and the coolant chamber 34. Alternatively, apertures (not shown) can be formed in the plates 26, 26' adjacent the seal member 100 or the planar surface 400 between the header opening 42 and the seals 404, 404', respectively, to provide fluid communication between the coolant header and the coolant chamber 34.

The planar surface 400 compensates for a misalignment between adjacent plates 20, 22 which would result in a reduction in the effectiveness of the seal between the adjacent plates 20, 22. The adjacent plates 20, 22 can have some degree of a lateral misalignment due to a manufacturing variation, for example. In the embodiment illustrated in FIG. 6, the seal member 100 as illustrated in FIG. 3*a* is shown. It should be understood that the seal member 100', 100", 100''' as illustrated in FIGS. 3*b* to 3*d* can be employed to form the seal shown in FIG. 6.

The fuel cell stack 10 featuring the sealing members 100, 100', 100", 100''' and the seal assemblies 200 and 300 of the present invention can be manufactured at a reduced cost compared to a gasket or fuel cell plate employing a typical prior art seal. The sealing member 100, for example, does not require additional surface finish treatment such as applying a sealing material thereto. Additionally, the sealing member 100 and the seal assemblies 200 and 300 are effective to form and maintain a substantially fluid tight seal over a wider range of dimensional variation within the fuel cell stack 10. The effectiveness of the sealing member 100 and the seal assemblies 200 and 300 to accommodate such variation minimizes the number of critical tolerances that must be maintained in the various components of the fuel cell stack 10. The minimized number of critical tolerances minimizes a manufacturing cost of the fuel cell plate 26.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A bipolar plate for a fuel cell comprising:
   a plate with a first surface a second surface, and a plurality of header openings formed therein;
   a flow field formed on the first surface of the plate, the flow field including an inlet region and an outlet region, the inlet region and the outlet region having feed area channels to provide fluid communication with at least one header opening; and
   at least one elongated sealing member formed around at least one of the header openings formed in the plate, the sealing member configured to cooperate with a seal assembly to form a substantially fluid tight seal therebetween, wherein the sealing member includes a first lateral side and a spaced apart second lateral side, each of the first lateral side and the second lateral side having an arcuate upper end, with a substantially planar sealing surface disposed in between the first lateral side and the second lateral side, the planar sealing surface being recessed in respect of the arcuate upper ends of the first lateral side and the second lateral side.

2. The bipolar plate according to claim 1, wherein at least a first radius and a second radius define the first lateral side, and at least a first radius and a second radius define the second lateral side to provide a resiliency to the sealing member.

3. The bipolar plate according to claim 1, wherein the sealing member includes a plurality of coextensive elongate protuberances, each protuberance having a first lateral side and a spaced apart second lateral side, with a sealing surface disposed therebetween.

4. A seal assembly adjacent a fuel cell plate comprising:
   a fuel cell plate with a first surface, a second surface, and a plurality of header openings formed therein;
   a flow field formed on the first surface of the plate, the flow field including an inlet region and an outlet region, the inlet region and the outlet region having feed area channels to provide fluid communication with at least one header opening;
   at least one elongated sealing member formed around at least one of the header openings formed in the plate, the sealing member configured to cooperate with a seal assembly to form a substantially fluid tight seal therebetween, wherein the sealing member includes a first lateral side and a spaced apart second lateral side, each of the first lateral side and the second lateral side having an arcuate upper end, with a substantially planar sealing surface disposed in between the first lateral side and the second lateral side, the planar sealing surface being recessed in respect of the arcuate upper ends of the first lateral side and the second lateral side; and
   at least one sealing component including a unitized electrode assembly having a first surface and a second surface, wherein the sealing component is configured to cooperate with the sealing member to form a substantially fluid tight seal therebetween.

5. The seal assembly adjacent a fuel cell plate according to claim 4, wherein at least a first radius and a second radius define the first lateral side, and at least a first radius and a second radius define the second lateral side to provide a resiliency to the sealing member.

6. The seal assembly adjacent a fuel cell plate according to claim 4, wherein the sealing member and the sealing component circumscribe a sealed area of the plate.

7. The seal assembly adjacent a fuel cell plate according to claim 4, wherein the sealing component further includes:
   a seal formed from an elastomer and disposed on the first surface of the unitized electrode assembly configured to form a substantially fluid tight seal between the unitized electrode assembly and the sealing member of the plate; and
   a seal support having a first surface and a second surface, the first surface in contact with the second surface of the unitized electrode assembly and the second surface in contact with an adjacent plate.

8. The seal assembly adjacent a fuel cell plate according to claim 4, wherein the sealing component further includes:
   a seal having a first surface and a second surface, the first surface configured to form a substantially fluid tight seal with the sealing member of the plate; and
   a seal support having a first surface and a second surface, the first surface configured to form a substantially fluid tight seal with the second surface of the seal,
   wherein the first surface of the unitized electrode assembly is configured to form a substantially fluid tight seal with the second surface of the seal support and the second surface of the unitized electrode assembly is in contact with an adjacent plate.

9. A fuel cell stack comprising:
   at least one end plate having a flow field formed on a surface thereof and a plurality of header openings formed therein in selected fluid communication with the flow field, the flow field including an inlet feed region, an outlet region, a plurality of feed area channels in selected fluid communication with the inlet region and the outlet region, and at least one sealing member formed around at least one of the header openings formed in the end plate, wherein the sealing member includes a first lateral side and a spaced apart second lateral side, each of the first lateral side and the second lateral side having an arcuate upper end, with a substantially planar sealing surface disposed in between the first lateral side and the second lateral side, the planar sealing surface being recessed in respect of the arcuate upper ends of the first lateral side and the second lateral side;

at least one bipolar plate disposed adjacent the end plate, wherein each bipolar plate includes, a flow field formed on at least one of a first surface and a second surface and a plurality of header openings formed therein in selected fluid communication with the flow field, the flow field including, an inlet region, an outlet region, a plurality of feed area channels in selected fluid communication with the inlet region and the outlet region, and at least one sealing member formed around at least one of the header openings formed in the bipolar plate;

a unitized electrode assembly disposed between each plate;

a seal having a first surface and a second surface, the first surface configured to form a substantially fluid tight seal with the sealing member of at least one of the end plate and the bipolar plate; and a seal support having a first surface and a second surface, the first surface configured to form a substantially fluid tight seal with one of the second surface of the seal and the unitized electrode assembly.

10. The fuel cell stack according to claim 9, wherein at least a first radius and a second radius define the first lateral side, and at least a first radius and a second radius define the second lateral side to provide a resiliency to the sealing member.

11. The fuel cell stack according to claim 9 including a bipolar plate configured to form the at least one end plate, wherein one of the first surface and the second surface of the bipolar plate form a terminal side in the end plate by blocking fluid communication between at least one header opening and the flow field formed in the terminal side.

12. The fuel cell stack according to claim 11 including:
an electrically conductive plate disposed adjacent the terminal side of the end plate;
a seal support having a first surface and a second surface, the first surface configured to form a substantially fluid tight seal with the electrically conductive plate, and the second surface spanning selected feed area channels formed in the terminal side of the endplate; and
a spacer disposed between the seal support and the terminal side of the end plate, the spacer forming a substantially fluid tight seal between the second surface of the seal support and the terminal side of the end plate to prevent the flow of fluid through the feed area channels spanned by the seal support.

13. The fuel cell stack according to claim 12, wherein the seal support and the spacer are integrally formed in at least one of the terminal side of the end plate and the terminal side of the conductive plate.

* * * * *